US010339035B2

(12) United States Patent
Ooshima et al.

(10) Patent No.: US 10,339,035 B2
(45) Date of Patent: Jul. 2, 2019

(54) TEST DB DATA GENERATION APPARATUS

(71) Applicant: Hitachi, Ltd., Tokyo (JP)

(72) Inventors: Keishi Ooshima, Tokyo (JP); Yasunori Hashimoto, Tokyo (JP); Ryota Mibe, Tokyo (JP); Hirofumi Danno, Tokyo (JP); Kiyoshi Yamaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 216 days.

(21) Appl. No.: 15/274,395

(22) Filed: Sep. 23, 2016

(65) Prior Publication Data

US 2017/0091082 A1 Mar. 30, 2017

(30) Foreign Application Priority Data

Sep. 28, 2015 (JP) ................................ 2015-189121

(51) Int. Cl.
| G06F 17/30 | (2006.01) |
| G06F 7/00 | (2006.01) |
| G06F 11/36 | (2006.01) |
| G06F 16/21 | (2019.01) |

(52) U.S. Cl.
CPC .......... *G06F 11/3684* (2013.01); *G06F 16/21* (2019.01)

(58) Field of Classification Search
CPC ....................... G06F 11/3684; G06F 17/30289
USPC ........................................................ 707/804
See application file for complete search history.

(56) References Cited

U.S. PATENT DOCUMENTS

| 5,655,074 A * | 8/1997 | Rauscher | G06F 11/3616 702/179 |
| 9,836,389 B2 * | 12/2017 | Levy | G06F 11/3684 |
| 9,836,519 B2 * | 12/2017 | Kociubes | G06F 16/283 |
| 2005/0278357 A1 * | 12/2005 | Brown | G06F 16/2462 707/999.1 |
| 2006/0123009 A1 * | 6/2006 | Bruno | G06F 16/2462 707/999.01 |
| 2009/0164478 A1 * | 6/2009 | Natanov | G06F 11/3684 707/999.1 |
| 2009/0182756 A1 * | 7/2009 | Kang | G06F 16/217 707/999.102 |
| 2012/0173587 A1 * | 7/2012 | Clifford | G06F 11/3684 707/802 |
| 2013/0139003 A1 * | 5/2013 | Patwardhan | G06F 11/3684 714/32 |
| 2013/0198165 A1 * | 8/2013 | Cheng | G06F 16/21 707/714 |
| 2014/0006459 A1 * | 1/2014 | Guo | G06F 16/211 707/805 |
| 2014/0006866 A1 * | 1/2014 | Clifford | G06F 11/3684 714/32 |
| 2014/0237450 A1 * | 8/2014 | Levy | G06F 11/3684 717/124 |

(Continued)

FOREIGN PATENT DOCUMENTS

JP 2001-256076 A 9/2001

*Primary Examiner* — Pavan Mamillapalli
(74) *Attorney, Agent, or Firm* — Baker Botts L.L.P.

(57) ABSTRACT

A test DB data generation method for generating a database for testing, which approximates an existing database, the test DB data generation apparatus comprising: extracting distribution information of values of each column of the existing database; extracting column dependency information of the existing database; and generating test DB data based on the distribution information and the column dependency information.

3 Claims, 7 Drawing Sheets

(56) References Cited

U.S. PATENT DOCUMENTS

2015/0088809 A1* 3/2015 Kociubes .......... G06F 17/30312
  707/605

* cited by examiner

TABLE NAME: USER TABLE                                     1111

| USER ID (PK) | USER NAME | REGISTRATION DATE | DEPARTMENT | ... |
|---|---|---|---|---|
| A0001 | SUZUKI | 20101001 | SALES DEPARTMENT | ... |
| A0002 | SATO | 20090401 | SALES DEPARTMENT | ... |
| C0001 | TANAKA | 20120401 | DEVELOPMENT DEPARTMENT | ... |
| X0001 | YAMADA | 20111130 | OTHER DEPARTMENT | ... |
| ... | ... | ... | ... | ... |

*FIG. 3A*

TABLE NAME: APPLICATION TABLE                              1112

| APPLICATION ID (PK) | USER ID (FK) | DEPARTMENT CODE | ... |
|---|---|---|---|
| 0001 | A0001 | 1 | ... |
| 0002 | A0001 | 1 | ... |
| 0003 | A0002 | 1 | |
| 0004 | A0002 | 1 | ... |
| 0005 | B0001 | 1 | |
| 0006 | X0001 | 0 | ... |
| ... | ... | ... | ... |

*FIG. 3B*

TABLE DEFINITION : USER TABLE

| COLUMN NAME | TYPE | SIZE | PK | FK |
|---|---|---|---|---|
| USER ID | String | 8 | O | |
| USER NAME | String | 20 | | |
| REGISTRATION DATE | Date | 8 | | |
| DEPARTMENT | String | 8 | | |
| ... | | | | |

*FIG. 4A*

TABLE DEFINITION: APPLICATION TABLE

| COLUMN NAME | TYPE | SIZE | PK | FK |
|---|---|---|---|---|
| APPLICATION ID | String | 8 | O | |
| USER ID | String | 20 | | USER TABLE: USER NAME |
| DEPARTMENT CODE | Date | 8 | | |
| ... | | | | |

*FIG. 4B*

| TABLE NAME | COLUMN NAME | GROUP | FREQUENCY |
|---|---|---|---|
| USER TABLE | USER ID | A0001-A9999 | 50% |
| | | B0001-B9999 | 20% |
| | | C0001-C9999 | 15% |
| | | D0001-D9999 | 10% |
| | | X0001-X9999 | 5% |
| | USER NAME | FAMILY NAME | 100% |
| | REGISTRATION DATE | 20090101-20091231 | 40% |
| | | 20100101-20101231 | 40% |
| | | 20110101-20111231 | 20% |
| | DEPARTMENT | SALES DEPARTMENT | 70% |
| | | DEVELOPMENT DEPARTMENT | 25% |
| | | OTHER DEPARTMENTS | 5% |

*FIG. 5*

| 1141 | 1142 | 1143 | 1144 | 1145 | 1146 | 1147 | 1148 | 1149 |
|---|---|---|---|---|---|---|---|---|
| RULE SOURCE TABLE | RULE SOURCE COLUMN | RULE SOURCE COLUMN VALUE | RULE TARGET TABLE | RULE TARGET COLUMN | RULE TARGET COLUMN VALUE | SUPPORT RATE | CERTAINTY | LIFT VALUE |
| USER | USER ID | A0001-A9999 | USER | DEPARTMENT | SALES DEPARTMENT | 50% | 100% | 1.42 |
| USER | USER ID | B0001-B9999 | USER | DEPARTMENT | SALES DEPARTMENT | 18% | 90% | 1.28 |
| USER | USER ID | C0001-C9999 | USER | DEPARTMENT | DEVELOPMENT DEPARTMENT | 15% | 100% | 4 |
| USER | USER ID | D0001-D9999 | USER | DEPARTMENT | DEVELOPMENT DEPARTMENT | 8% | 80% | 3.2 |
| USER | USER ID | E0001-E9999 | USER | DEPARTMENT | OTHER DEPARTMENT | 5% | 100% | 20 |
| USER | DEPARTMENT | SALES DEPARTMENT | APPLICATION | DEPARTMENT CODE | 1 | 70% | 100% | 1.05 |
| USER | DEPARTMENT | DEVELOPMENT DEPARTMENT | APPLICATION | DEPARTMENT CODE | 1 | 25% | 100% | 1.05 |
| USER | DEPARTMENT | OTHER DEPARTMENT | APPLICATION | DEPARTMENT CODE | 0 | 5% | 100% | 20 |

*FIG. 6*

|  |  | RULE TARGET | | | |
|---|---|---|---|---|---|
|  |  | USER ID | USER NAME | REGISTRATION DATE | DEPARTMENT | ... |
| RULE SOURCE | USER ID | — | 1.04 | 0.99 | 2.43 | |
| | USER NAME | 1.02 | — | 0.95 | 1.01 | |
| | REGISTRATION DATE | 0.96 | 0.92 | — | 1.12 | |
| | DEPARTMENT | 1.52 | 1.01 | 0.97 | — | |
| | ... | | | | | |

FIG. 7

| USER ID (PK) | USER NAME | REGISTRATION DATE | DEPARTMENT | ... |
|---|---|---|---|---|
| A1452 | | | SALES DEPARTMENT | ... |
| A3452 | | | SALES DEPARTMENT | ... |
| D5231 | | | DEVELOPMENT DEPARTMENT | ... |
| D2341 | | | SALES DEPARTMENT | ... |
| ... | ... | ... | ... | ... |

FIG. 8

TEST DB DATA GENERATION APPARATUS

CLAIM OF PRIORITY

The present application claims priority from Japanese patent application JP 2015-189121 filed on Sep. 28, 2015, the content of which is hereby incorporated by reference into this application.

BACKGROUND OF THE INVENTION

This invention relates to data generation in a testing phase when an enterprise system is replaced.

When an enterprise system is replaced, actual data that is stored in a database (DB) of an existing system is migrated to a new system to be used. Thus, in a testing phase, testing needs to be conducted for actual data in the existing system. However, in recent years, there have been many cases in which actual data cannot be used until execution of the migration due to an increased level of security requirements. In such cases, a software engineer creates testing data based on existing written specifications and conducts testing. However, for example, the existing written specifications may not be updated to cause a difference in specification from the actual data, or the software engineer may make a mistake in designing the testing data, with the result that the software engineer may create testing data that has a difference in characteristic from the actual data. Accordingly, a bug may not be detected in the testing phase due to the difference in characteristic between the testing data and the actual data, to thereby cause a failure after execution of the migration.

There is known JP 2001-256076 A as the related art of this technical field. In JP 2001-256076 A, there is a disclosure of "extracting data characteristics of each column by performing statistical analysis on production DB data and generating test DB data based on the extracted data characteristics".

With the technology of JP 2001-256076 A, it is possible to generate test DB data in units of tables based on the data characteristics of each column. However, in an actual enterprise system, columns and tables have numerous dependencies, and those characteristics cannot be grasped with use of the data characteristics of each column alone. In particular, in an enterprise system, performance testing needs to be conducted with test DB data that has reflected dependencies between columns or tables because DB accesses for searching or updating a plurality of tables or columns are made numerous times. In order to reflect those dependencies, some approaches are conceivable, such as directly correcting the generated test DB data by a user or developing a separate program for reflecting dependencies between columns in the test DB data. However, those approaches impose a high workload on the user. Further, the data characteristics of each column may be different from those of a production DB due to the user correction or the separate program.

SUMMARY OF THE INVENTION

It is therefore an object of the present invention to generate test DB data that has reflected dependencies between columns or tables.

In order to solve the above-mentioned problems, one aspect of the present invention involves generating test DB data that has reflected dependencies between columns or tables. More specifically, one embodiment of the present invention involves analyzing information on dependencies between columns or tables based on production DB data and DB schemas, and generating test DB data based on the analysis result.

Further, the present invention includes the below configuration. A test DB data generation method for generating a database for testing, which approximates an existing database, the test DB data generation method comprising: extracting distribution information of values of each column of the existing database; extracting column dependency information of the existing database; and generating test DB data based on the distribution information and the column dependency information. According to the present invention, it is possible to generate the test DB data that has reflected the dependencies between columns or tables of the existing DB. With this, testing can be conducted with the test DB data similar to actual data. Therefore, it is possible to detect a failure due to an oversight of the dependencies between columns or tables at an early stage of a testing phase.

Problems, configurations, and effects which are not mentioned above are explained in the following embodiments.

BRIEF DESCRIPTIONS OF DRAWINGS

The present invention can be appreciated by the description which follows in conjunction with the following figures, wherein:

FIG. 3A is an example of a user table according to an embodiment;

FIG. 3B is an example of an application table according to an embodiment;

FIG. 4A is an example of a table representing a database schema according to an embodiment;

FIG. 4B is an example of a table representing the database schema according to an embodiment;

FIG. 5 is an example of a table representing column distribution information according to an embodiment;

FIG. 6 is an example of a table representing column dependency information according to an embodiment;

FIG. 7 is an example of a table representing column dependency degree information according to an embodiment;

FIG. 8 is an example of a table representing test DB data according to an embodiment.

DETAILED DESCRIPTION OF THE PREFERRED EMBODIMENTS

Figure 1:
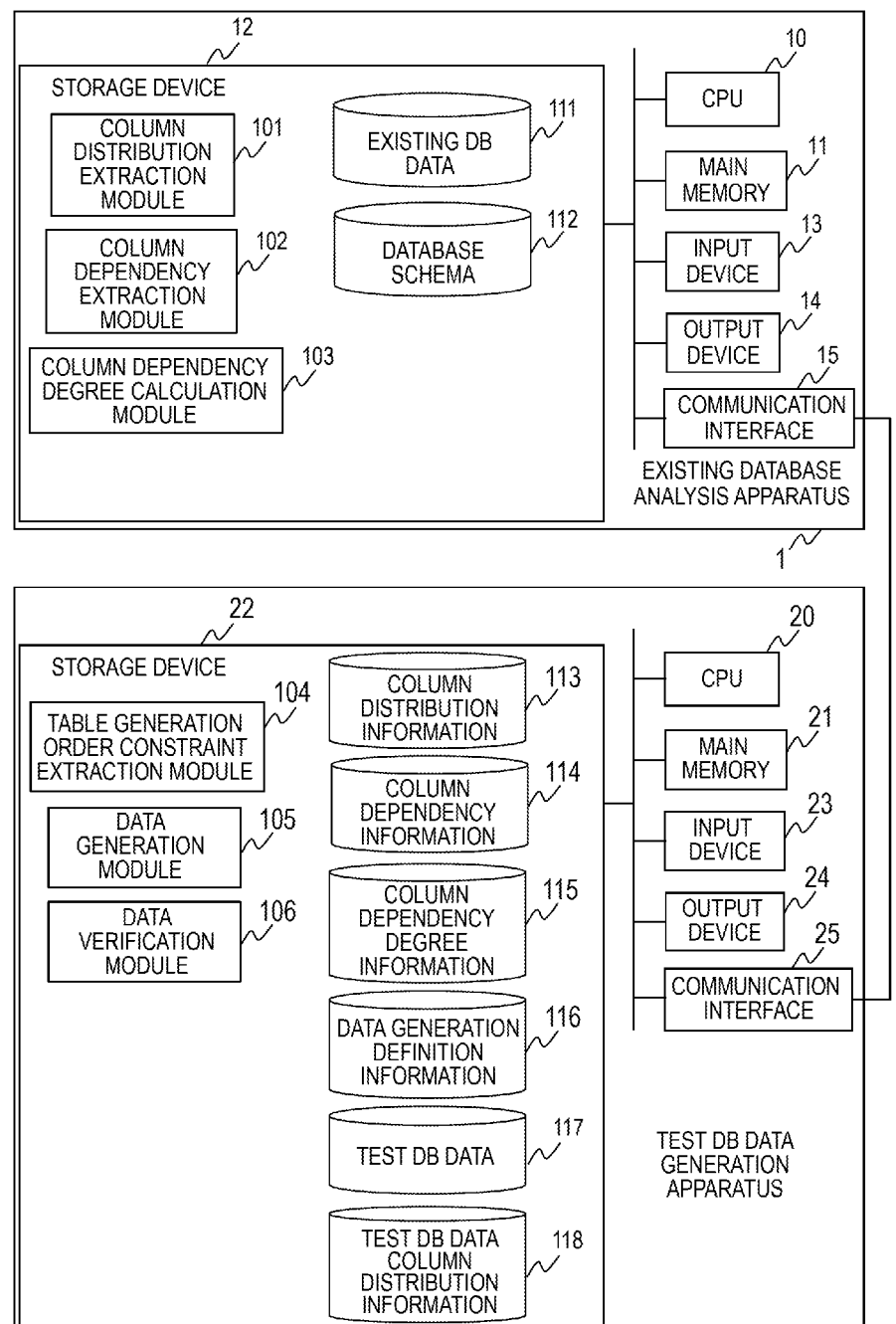
FIG. 1 is an example of a diagram for illustrating configurations of an existing database analysis apparatus and a test DB data generation apparatus according to an embodiment.

An embodiment of the present invention is described below in detail with reference to the drawings. FIG. 1 is an example of a diagram for illustrating configurations of an existing database analysis apparatus 1 and a test DB data generation apparatus 2 according to this embodiment. The existing database analysis apparatus 1 is a computer including a CPU 10, a main memory 11, a storage device 12, an input device 13, an output device 14, and a communication interface 15, and those components are coupled to one another via, for example, an internal bus. The CPU 10 is configured to read modules stored in the storage device 12 into the main memory 11 for execution, to thereby perform various types of processing. The storage device 12 is configured to store a column distribution extraction module 101, which is configured to extract a distribution of values of each column of an existing database, a column dependency extraction module 102, which is configured to extract dependencies between columns of the existing database, a column dependency degree calculation module 103, which is configured to calculate degrees of dependencies between columns, an existing DB data 111, which stores data of the existing database, and a database schema 112, which stores schema information of the existing database.

Figure 2:
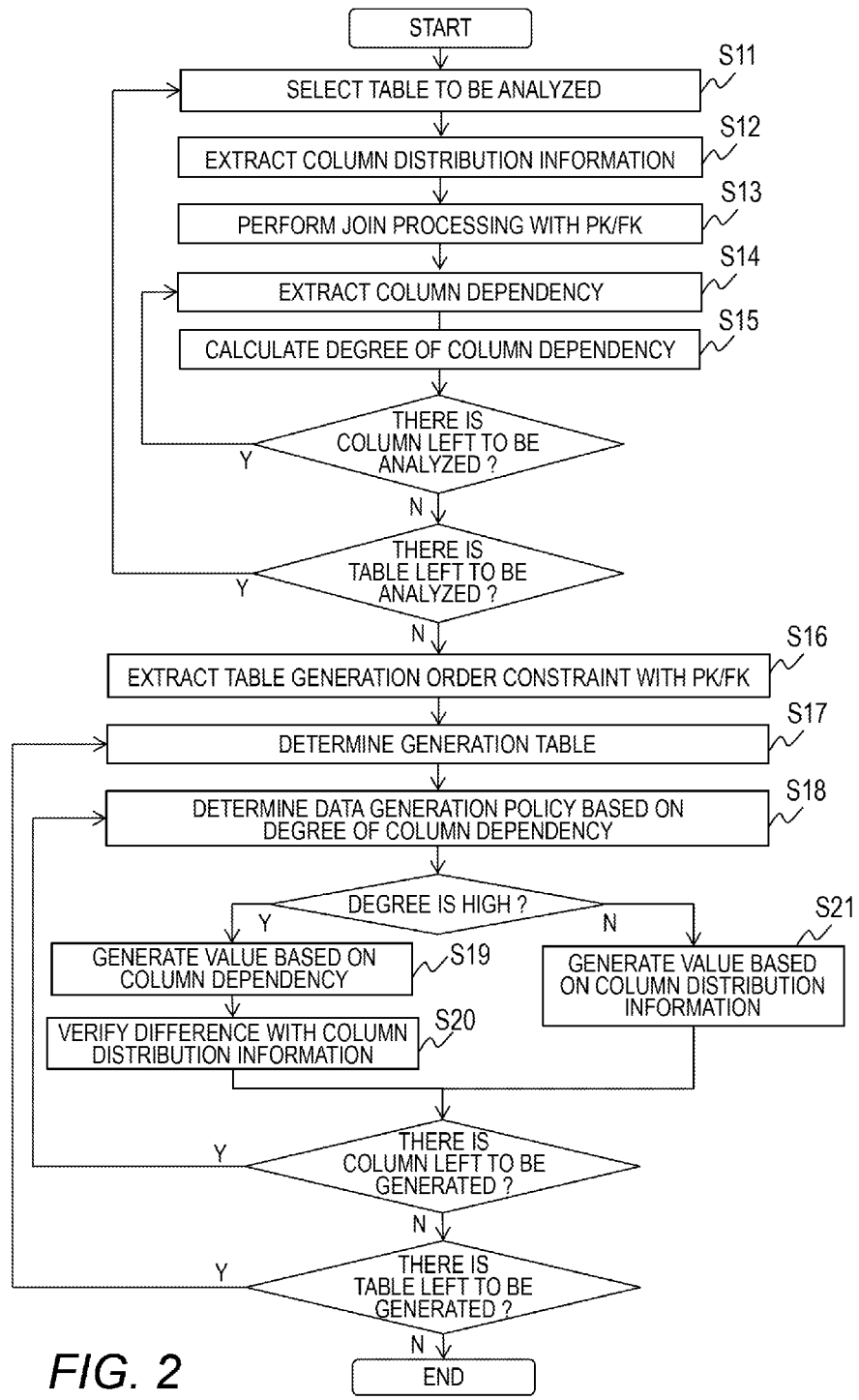
FIG. 2 is an example of a flowchart for illustrating processing of the existing database analysis apparatus and the test DB data generation apparatus according to an embodiment.

The test DB data generation apparatus 2 is a computer including a CPU 20, a main memory 21, a storage device 22, an input device 23, an output device 24, and a communication interface 25, and those components are coupled to one another via, for example, an internal bus. The CPU 20 is configured to read modules stored in the storage device 22 into the main memory 21 for execution, to thereby perform various types of processing. The storage device 22 is configured to store a table generation order constraint extraction module 104, which is configured to extract a constraint on an order of generating a table for which test DB data is to be generated, a data generation module 105, which is configured to determine a policy of generating data for each column and to generate test DB data in accordance with the generation policy, a data verification module 106, which is configured to compare column distribution information of the generated test DB data and the existing DB data with each other to calculate the difference, column distribution information 113, which stores distribution information of columns, column dependency information 114, which stores information on dependencies between columns, column dependency degree information 115, which stores information on degrees of dependencies between columns, data generation definition information 116, which stores the number of records to be generated for each table, test DB data 117, which stores the generated test DB data, and test DB data column distribution information 118, which stores distribution information of columns of the generated test DB data. FIG. 2 is an example of a flowchart for illustrating processing of the existing database analysis apparatus 1 and the test DB data generation apparatus 2 according to this embodiment. In the following, a description is given of operations of the respective modules of FIG. 1 based on the flowchart of FIG. 2.

In Step S11, a table of a database to be analyzed is selected. In Step S12, the column distribution extraction module 101 uses the existing DB data 111 and the database schema 112 as input information to group the values of columns, and extracts the column distribution information 113, which stores a frequency of appearance for each group. FIG. 3A and FIG. 3B are examples of the existing DB data 111 to be used for description in this embodiment. FIG. 3A is an example of a user table 1111, which stores, for each user of a system, a user ID, a user name, a date of registration with the system, his or her department, and the like. FIG. 3B is an example of an application table 1112, which stores an application ID, an applicant's user ID, a department code associated with his or her department, and the like, serving as application processing information received by the system. FIG. 4A and FIG. 4B are examples of the database schema 112. The database schema 112 stores a column name, a type, a size, a PK for determining a primary key, and a FK for determining a foreign key and storing the name of an associated primary key of the user table 1111 and the application table 1112. In this example, the user ID of the user table and the application ID of the application table serve as PKs, and the user ID of the application table serves as a FK. In this embodiment, a specific description is given using those two tables. FIG. 5 is an example of the column distribution information 113. The column distribution information 113 is formed of a table name 1131 for which distribution information has been extracted, a column name 1132, a group 1133 for each column, and a frequency 1134 of appearance for each group.

In this example, regarding the user ID column of the user table, it is indicated that the probability of appearance of values of from A0001 to A9999 is 50%. In order for a grouping method to ensure that the number of data records to be hit by an SQL statement is the same as that for the production DB, grouping that is based on a forward match, grouping that is based on the number of digits, and grouping that is based on years are performed for character type data, numeric data, and date (year/month/day) data, respectively. Further, an SQL statement to be used by a user in the system may be analyzed to define the grouping rule.

In Step S13, the column dependency extraction module 102 joins a table to be analyzed with another table based on information of the FK of the database schema 112. In this embodiment, the user ID serves as a FK. Thus, the application table is joined with the user table when the application table is analyzed. In Step S14, a dependency between columns is extracted for the table, which is obtained by the column dependency extraction module 102 joining the tables, based on the groups of the column distribution information 113, and the result is stored in the column dependency information 114. In this embodiment, the dependency is extracted based on the association rule analysis.

FIG. 6 is an example of the column dependency information 114. The column dependency information 114 stores the dependency between extracted columns, and stores a rule source table 1141 serving as a rule source, a rule source column 1142, a rule source column value 1143, a rule target table 1144 serving as a rule target, a rule target column 1145, a rule target column value 1146, a support rate 1147 for indicating the frequency of appearance of a rule, a certainty 1148 for indicating the probability of a rule target being satisfied when a rule source is satisfied, and a LIFT value 1149 for indicating a ratio of the frequency of both of the rule source and the rule target being satisfied to the frequency of the rule target being satisfied. The first row stores a rule in which, when the user ID column of the user table takes a value of from A0001 to A9999, the department column takes a value of a sales department. The probability of this rule appearing in the table is 50%, the probability of the department column taking the value of the sales department when the user ID column takes a value of from A0001 to A9999 is 100%, and the ratio of the certainty to the probability (70%) of the department column taking the value of the sales department is 1.42 (100/70).

In this embodiment, the column dependency information is extracted based on the association rule analysis. However, another existing technique for extrasting the dependency between a plurality of columns, e.g., a technique of calculating the frequency of a group of each column appearing in the same record, may be employed.

In Step S15, the column dependency degree calculation module 103 calculates a degree of the dependency between columns based on the column dependency information 114, and stores the result in the column dependency degree information 115. In this embodiment, the degree is calculated based on the harmonic mean value of the LIFT values 1149 of the extracted dependency between columns.

FIG. 7 is an example of the column dependency degree information 115. The vertical header represents a column name of the rule source, and the horizontal header represents a column name of the rule target. The degree of each rule is stored in the table. For example, the degree of the rule source being the user ID column and the rule target being the department column is 2.43. It is indicated that, as this value becomes higher, the dependency between columns becomes stronger. In this embodiment, the degree is calculated based on the harmonic mean value of the LIFT values. However, a gap between an expected value calculated based on the column distribution information 113 and the frequency of a group of each column appearing in the same record may be calculated by a chi-square test to set the statistical value as the degree. After processing of from Step S11 to Step S15 is executed for all the tables and columns, the processing proceeds to Step S16.

In Step S16, the table generation order constraint extraction module 104 extracts the constraint information on the order of generating a table based on the information of the PK and FK of the database schema 112. Specifically, the table generation order constraint extraction module 104 sets a table containing the FK column as a child table and sets a table containing a column referred to by the FK as a parent table, to thereby extract a parent-child relationship between tables.

In Step S17, the data generation module 105 selects a table of a database for which data is to be generated based on the parent-child relationship between tables extracted by the table generation order constraint extraction module 104. The table to be selected is a table whose parent table does not exist or a table for which data of all the existing parent tables has already been generated. Further, the data generation module 105 acquires information on the number of records to be generated for each table based on the data generation definition information 116.

In Step S18, the data generation module 105 determines a data generation policy for each column based on the column dependency degree information 115. Specifically, when the degree of dependency between columns exceeds a predetermined threshold value, a value is generated based on the column dependency information of the dependency. When a plurality of degrees of dependencies between columns exceeding the threshold value exist for one column, a value is generated based on information of the dependency between columns having the highest degree. For example, in the case of the department column of the user table, the degree of dependency between the department and the user ID of the user table is 2.43, which is the highest. Thus, the data generation module 105 determines a policy of generating a value based on the column dependency information 114 of the user ID and the department, and the processing proceeds to Step S19. On the other hand, the user ID column, the user name column, and the registration date column of the user table have no other columns having high degrees, and thus the data generation module 105 determines a policy of generating a value for those columns based on the column distribution information 113, and the processing proceeds to Step S21.

In Step S19, the data generation module 105 generates a value based on the information of the column dependency information 114. The data generation module 105 determines to which group the value of a column specified by the rule source belongs, and generates a value of the rule target based the frequency of appearance of the rule that belongs to that group. FIG. 8 is an example of a case in which the value of the department column of the user table is generated based on the column dependency information 114 of the user ID and the department. In the first and second rows, the user ID columns correspond to the group of from A0001 to A9999, and thus values of the sales department are assigned to the department columns. In the third and fourth rows, the user ID columns correspond to the group of from D0001 to D9999, and thus a value of the development department is assigned to the department columns with a proportion of 80% and a value other than the development department is assigned to the department columns with a proportion of 20%.

In this embodiment, an example is given in which the value of the user ID column is already generated. When the value of the user ID column is not generated yet, the value of the user ID column is generated in preference to processing of generating the value of the department column.

In Step S20, the data verification module 106 calculates distribution information of each column of the generated test DB data, and registers the distribution information with the test DB data column distribution information 118. Further, the data verification module 106 calculates how much the distribution information is different from the column distribution information 113, and when the frequencies of appearance are greatly different from each other, the data verification module 106 registers the fact that the difference is large with the test DB data column distribution information 118. In this case, the phrase "frequencies of appearance are greatly different" means that the frequencies of appearance are different by a predetermined value (difference) or more.

In Step S21, a value is generated based on information of the column distribution information 113. The value is generated in accordance with the frequency of appearance for each group. In the case of the user ID of the user table, values of from A0001 to A9999 are generated with a proportion of 50% among pieces of data. Processing of from Step S17 to Step S21 is repeated for respective tables and columns. The description of specifics of the processing according to this embodiment is finished. According to this embodiment, it is possible to detect a failure due to a flaw in index design and an oversight of a column dependency at an early stage of a testing phase.

What is claimed is:

1. A test DB data generation apparatus for generating a database for testing, which approximates an existing database having a plurality of tables, each table having a plurality of corresponding columns that take on a corresponding plurality of values, the test DB data generation apparatus comprising:
   a column distribution extraction module extracting distribution information of values of each column of the existing database, wherein the column distribution information indicates, for one or more columns in a corresponding table, a frequency distribution of a range of the plurality of values taken on by said one or more columns in the existing database;
   a column dependency extraction module extracting column dependency information of the existing database, wherein the column dependency information indicates a probability that, when a first column in a first table takes on a source value that falls within a range of values, a second column in a second table takes on a target value;
   a data generation module generating test DB data based on the distribution information and the column dependency information, wherein the test DB data indicates, for the first table in the existing database, that when a first column in the first table takes on a first value, a second column in the first table takes on a second value in a proportion that corresponds to the probability indicated by the column dependency information; and a column dependency degree calculation module measuring a degree of dependency between columns of the existing database, wherein the column dependency extraction module is configured to:
  group pieces of data with a rule for each column of the existing database;
  replace the pieces of data with group names of respective groups obtained by the grouping; and
  calculate a degree of co-occurrence of pieces of data for a combination of two columns, and
wherein the data generation module is configured to determine whether or not to generate test DB data by using the column dependency information for each column based on the degree of dependency between columns calculated by the column dependency degree calculation module.

2. The test DB data generation apparatus according to claim 1, further comprising table generation order constraint extraction module extracting a constraint on an order of generating a table for which test DB data is to be generated.

3. The test DB data generation apparatus according to claim 1, further comprising data verification module extracting column distribution information of columns of test DB data, which is generated by using the column dependency information, and measuring a difference between the column distribution information and distribution information of values of respective columns of the existing database.

* * * * *